(12) United States Patent
Blair et al.

(10) Patent No.: US 8,711,341 B2
(45) Date of Patent: Apr. 29, 2014

(54) USING SETS OF OTDR RECEIVE FIBERS WITH DIFFERENT LENGTHS OF MARKER EVENTS TO VERIFY OPTICAL FIBER CONNECTIVITY

(75) Inventors: Chris Blair, Canterbury, NH (US); Scott Prescott, Belmont, NH (US); Tim Piper, Tilton, NH (US)

(73) Assignee: AFL Telecommunications LLC, Spartanburg, SC (US)

( * ) Notice: Subject to any disclaimer, the term of this patent is extended or adjusted under 35 U.S.C. 154(b) by 0 days.

(21) Appl. No.: 11/911,739

(22) PCT Filed: Jul. 14, 2006

(86) PCT No.: PCT/US2006/027646
§ 371 (c)(1),
(2), (4) Date: Aug. 12, 2008

(87) PCT Pub. No.: WO2007/009113
PCT Pub. Date: Jan. 18, 2007

(65) Prior Publication Data
US 2008/0297773 A1    Dec. 4, 2008

Related U.S. Application Data

(60) Provisional application No. 60/699,039, filed on Jul. 14, 2005.

(51) Int. Cl.
*G01N 21/00* (2006.01)

(52) U.S. Cl.
USPC .......................................... 356/73.1

(58) Field of Classification Search
USPC ................ 356/465, 478, 482, 498, 486, 73.1; 385/10–50
See application file for complete search history.

(56) References Cited

U.S. PATENT DOCUMENTS

| | | | |
|---|---|---|---|
| 4,289,398 A | | 9/1981 | Robichaud |
| 5,137,351 A | * | 8/1992 | So ................. 356/73.1 |
| 5,767,957 A | * | 6/1998 | Barringer et al. ............ 356/73.1 |
| 5,790,285 A | | 8/1998 | Mock |
| 7,808,621 B2 | * | 10/2010 | Russell ........................ 356/73.1 |
| 2007/0025676 A1 | * | 2/2007 | Russell ........................ 385/134 |
| 2009/0268197 A1 | * | 10/2009 | Perron et al. ................. 356/73.1 |

* cited by examiner

*Primary Examiner* — Hwa Lee
(74) *Attorney, Agent, or Firm* — Sughrue Mion, PLLC

(57) ABSTRACT

A test receiver for use with an Optical Time Domain Reflectometer (OTDR), including a first receive fiber having a first attribute, and a second receive fiber having a second attribute different from the first attribute. The attributes may be lengths, marker events, or both. This configuration reduces the number of times an OTDR operator must travel back and forth between cable ends when testing fibers.

15 Claims, 6 Drawing Sheets

USING SETS OF OTDR RECEIVE FIBERS WITH DIFFERENT LENGTHS OF MARKER EVENTS TO VERIFY OPTICAL FIBER CONNECTIVITY

CROSS-REFERENCE TO RELATED APPLICATIONS

This application is based upon and claims the benefit of priority from U.S. Provisional Application No. 60/699,039, filed Jul. 14, 2005 in the United States Patent and Trademark Office, the disclosure of which is incorporated herein in its entirety by reference.

BACKGROUND OF THE INVENTION

1. Field of the Invention

The invention relates to an apparatus and method for verifying optical fiber connectivity using an OTDR Test Receiver including receive fibers having different lengths.

2. Description of Related Art

Testing regimens for fiber optic cables normally include a determination of two key measurables. The first measurable is a transmission loss, or other similar parameters, of each fiber optic cable. The second measurable is a verification of the connectivity of each fiber, i.e., verifying that each fiber terminates at an expected port at each end of the cable.

Various testing devices for determining these measurables are known in the related art, including an Optical Time Domain Reflectometer (OTDR) and Optical Loss Test Sets (OLTS).

An OTDR generally is connected to a first end of a fiber to be tested, and transmits pulsed light signals along the fiber. Reflections and/or backscattering occur within the fiber due to discontinuities such as connectors, splices, bends and faults. The OTDR detects and analyzes these reflections and/or backscattering, and provides a OTDR trace that shows positions of discontinuities and an end-to-end loss in the fiber.

However, OTDRs require launch and receive test cables to effectively measure a full, end-to-end, transmission loss of the fiber optic line, since "deadzones" (caused by interference by closely spaced discontinuities) may obscure such a measurement. The launch test cable connects the OTDR to the first end of the fiber to be tested, and reveals the insertion loss and reflectance at the first end. Similarly, the receive test cable is connected to second end of the fiber to be tested, and reveals the insertion loss and reflectance at the second end, along with verifying the connectivity of the fiber optic line.

On the other hand, an OLTS provides a light source connected to one end of the fiber to be tested, which emits a signal that consists of a continuous wave at a specific wavelength. At the other end of the fiber to be tested is an optical power meter, which detects and measures the power level of the signal emitted from the light source. Such an OLTS can measure loss in the fiber to be tested by determining a difference in power level of the signal measured at the transmitting and receiving ends. Further, when utilizing an OLTS, a test result in which the light source and optical power meter communicate with each other also verifies the connectivity of the fiber to be tested.

Unfortunately, there are problems with both OTDR and OLTS. For example, both require either: (1) two technicians (i.e., one at each end of the fiber to be tested); or (2) one technician that travels back and forth between the two ends of the fiber to be tested, to test each fiber. The use of two technicians is costly and personnel-restricted, while the use of one technician traveling back and forth between the two ends of the fiber to be tested is so time consuming as to be impractical.

Further, with specific regard to OTDR, there is no particular way for the OTDR to identify which fiber is being tested. Thus, the technician must be very attentive to ensure that the proper fibers are tested, and the proper results are recorded.

BRIEF SUMMARY OF THE INVENTION

An object of the invention is to provide an apparatus and method for verifying optical fiber connectivity using an OTDR Test Receiver in which a technicians travel back and forth between opposite ends of a fiber is reduced.

In one aspect of the invention, a test receiver for use with an OTDR is provided, including: a first receive fiber having a first attribute; and a second receive fiber having a second attribute different from the first attribute.

In another aspect of the invention, a method of testing optical fibers using an OTDR is provided, including: arranging a test receiver at ends of the optical fibers opposite from the OTDR, the test receiver comprising a first receive fiber having a first attribute, and a second receive fiber having a second attribute different from the first attribute; connecting the first receive fiber to the end of one of the optical fibers; and connecting the second receive fiber to the end of another one of the optical fibers.

In another aspect of the invention, the a fiber connectivity testing system is provided, including: an OTDR at a terminal location; a first and a second optical fiber connected to the OTDR and extending between the terminal location and a hub location; a test receiver at the hub location, the test receiver comprising a first receive fiber having a first attribute and a second receive fiber having a second attribute different from the first attribute, wherein the first receive fiber is connected to the first optical fiber, and the second receive fiber is connected to the second optical fiber.

BRIEF DESCRIPTION OF THE DRAWINGS

The above and other objects, features and advantages of the invention will become more apparent by describing in detail exemplary embodiments thereof with reference to the attached drawings in which.

DETAILED DESCRIPTION OF EXEMPLARY EMBODIMENTS OF THE INVENTION

Exemplary embodiments of the invention will now be described below by reference to the attached Figures. The described exemplary embodiments are intended to assist the understanding of the invention, and are not intended to limit the scope of the invention in any way.

Figure 1A:
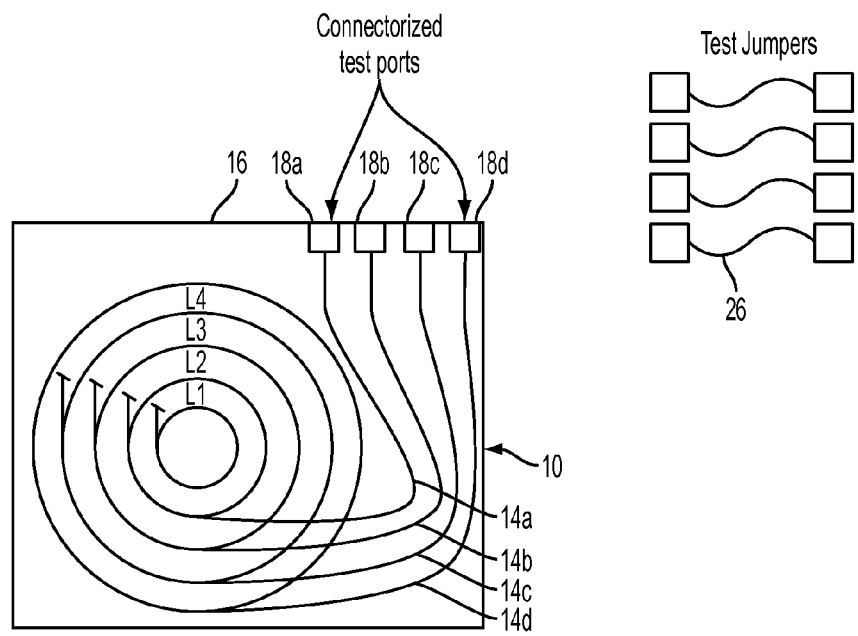
FIG. 1(a) shows an exemplary Test Receiver with connectorized test ports and test jumpers.
Figure 1B:
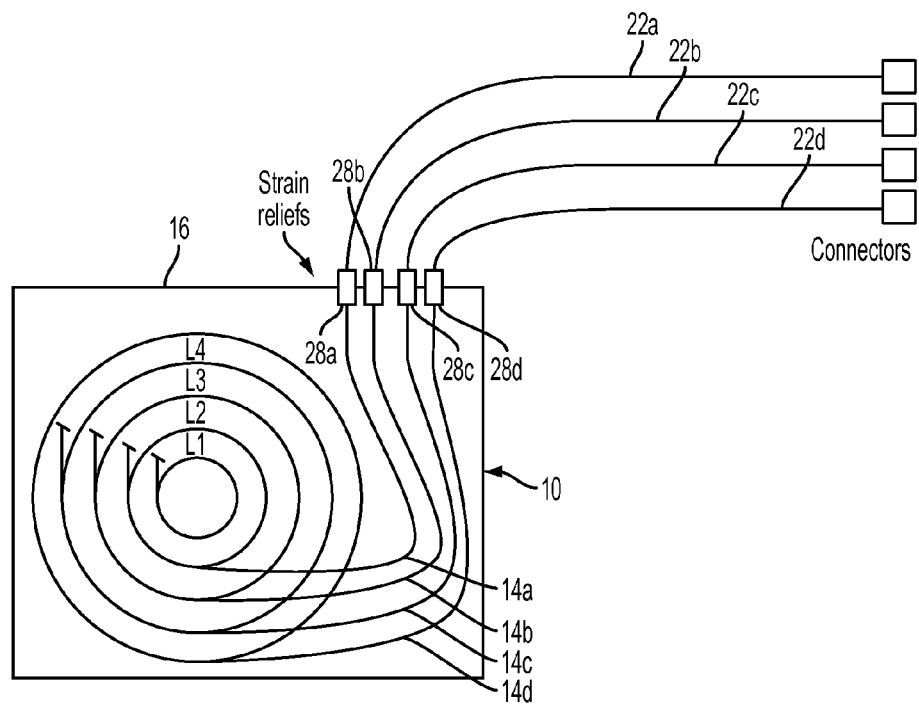
FIG. 1(b) shows an exemplary Test Receiver with pigtail connectors.

In a first exemplary embodiment of the invention, an OTDR Test Receiver (hereinafter "TR") 10 is provided, as shown in FIGS. 1(a) and 1(b). The TR 10 includes a set of N receive fibers (e.g., 14a, 14b, 14c and 14d in FIG. 1(a) (b)) housed in a common holder 12 (e.g., a box). The N receive fibers 14(a)-(d) are differentiated by length (e.g., L1, L2, L3, and L4 in FIGS. 1(a) and (b)) when viewed in an OTDR trace. The N receive fibers 14(a)-(d) terminate at an outer side 16 of TR 10, and are connected to at least one of a multi-fiber connector (not shown), multiple single-fiber connectors 18 (FIG. 1(a)), or in fiber pigtails (or jumpers) 22 (FIG. 1(b)). The N receive fibers 14(a)-(d) may also be connected to any other appropriate structure.

When the N receive fibers are differentiated by length, such as is shown by L1-L4 in FIGS. 1(a) and 1(b), the fiber lengths may increase linearly, that is: L1=L; L2=L+D; L3=L+2D; and L4=L+3D, for ease of manufacture and use. Alternatively, the fiber lengths may increase in some other appropriate fashion.

Alternatively, the N receive fibers 14(a)-(d) may be differentiated by marker events. These marker events may include: (1) high and low reflectivity OTDR events; (2) high or low optical loss events; or (3) concatenated sections of fiber with high and low backscatter coefficients to create patterns of high and low backscatter on OTDR traces. Other types of marker events could be wavelength specific using appropriate filters and sources. Further, the above markers can be concatenated and/or sequenced to create different marker combinations.

The length or marker event used to identify each N receive fiber (14a-d) in the TR 10 is clearly marked, or identified in some other way, on the common holder 12, or on each individual fiber housing. Further, the connectors on the outer side 16 of TR 10 are also clearly marked, for example "1", "2" ... "12" in a twelve fiber TR.

Figure 2:
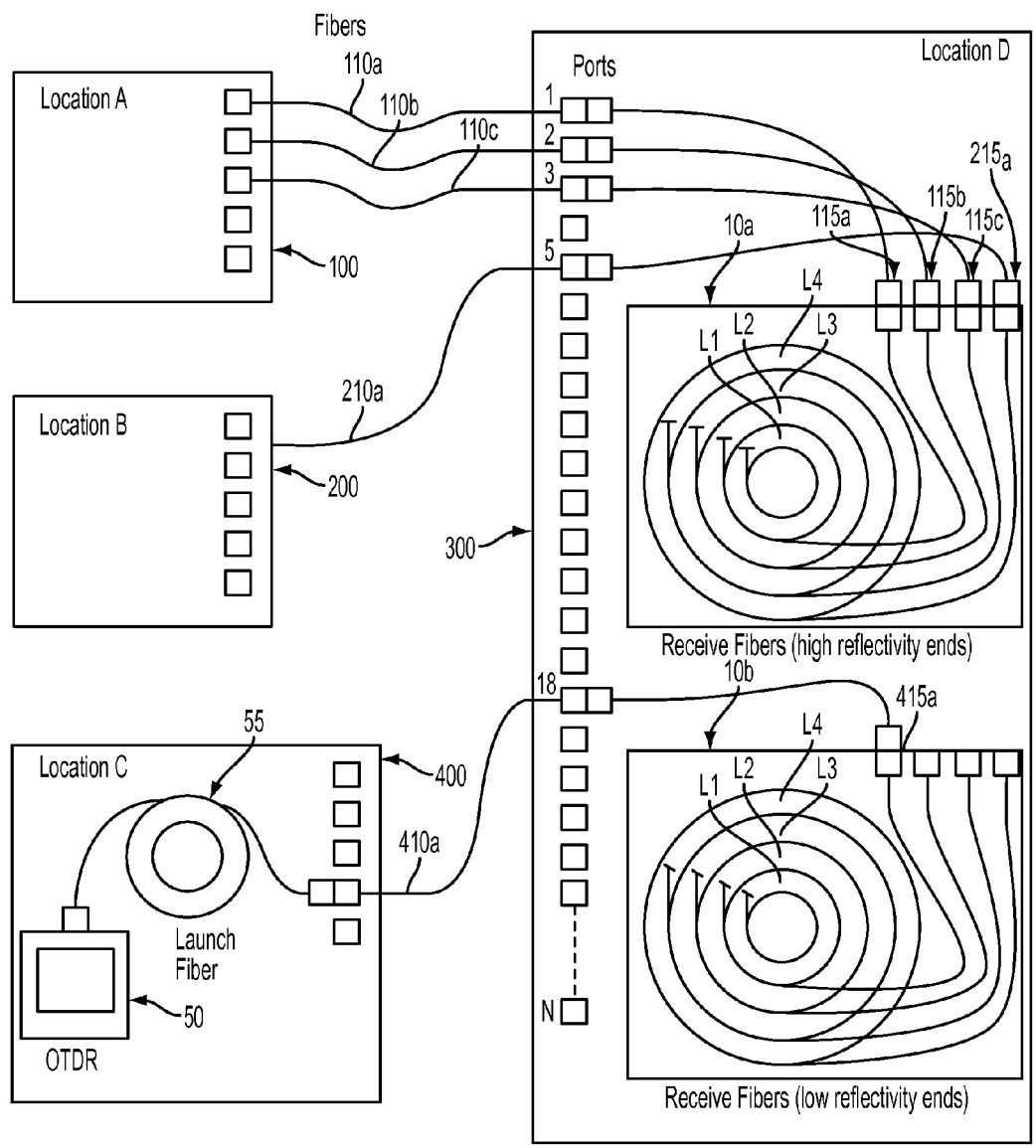
FIG. 2 is a schematic view of an exemplary arrangement of a Test Receiver arranged at a common hub location in communication with other terminal locations.

A TR 10 according to the above exemplary embodiment allows a single technician equipped with an OTDR 50 to verify the connectivity of optical fiber cables that connect one or more terminal locations 100, 200 to one or more common "hub" location(s) 300, such as is shown in FIG. 2.

Figure 3:
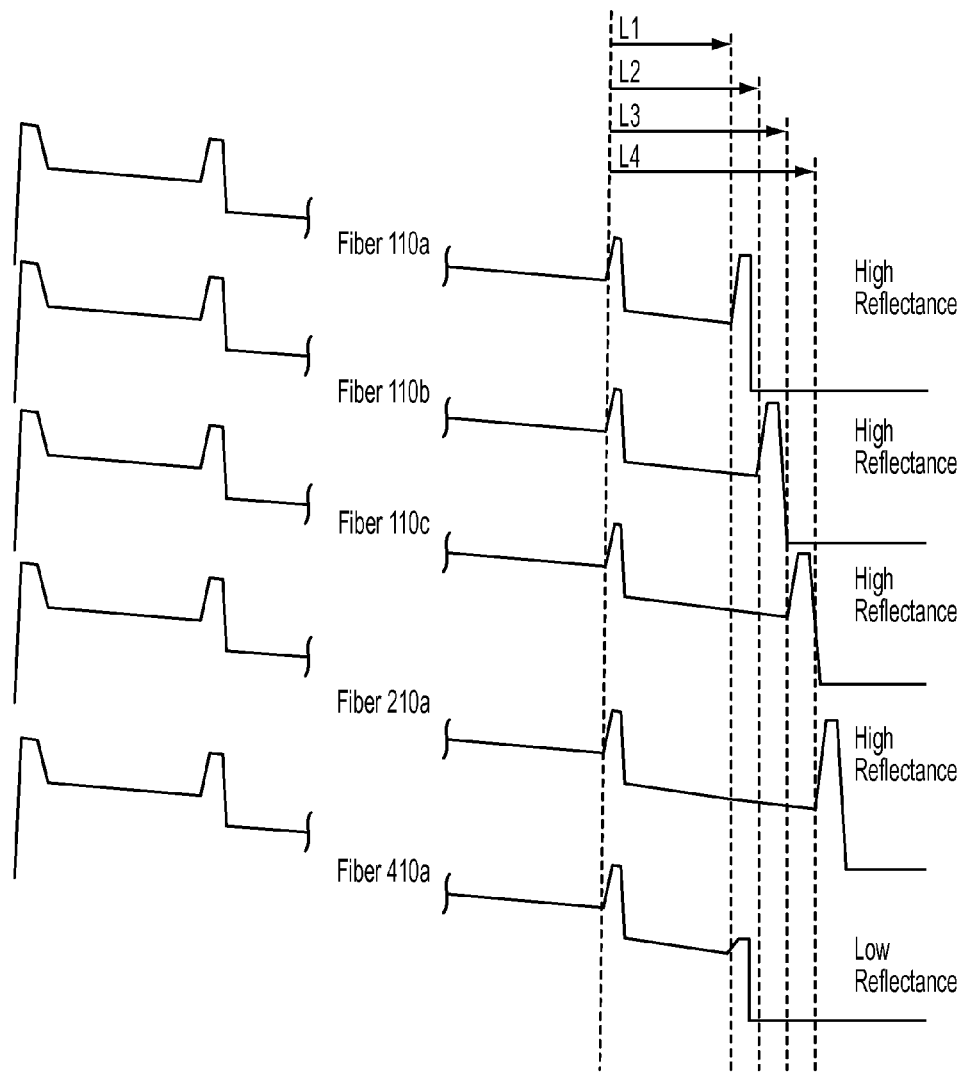
FIG. 3 is a graph of exemplary OTDR traces with respect to the arrangement shown in FIG. 2.

For example, in FIG. 2, a TR 10a, with high-reflectively ends, is located at the hub 300. With respect to terminal location 100, the TR 10's receive fibers 14(a)-(c) are connected to the hub-ends 115a, 115b, 115c of each network fiber (110a, 110b, 110c) to be tested. Then, one technician can verify the connectivity of each of the fibers 110a, 110b, 110c by measuring the distance between the last two events displayed on each OTDR trace using a manual or an automatic OTDR loss method, such as is shown in the first three traces in FIG. 3. Similarly, fibers 210a and 410a (connected to TR 10b with low reflectivity ends) of terminal location 200 and 300, respectively, can be tested, with results such as are shown in the last two traces in FIG. 3, using.

Further, when a launch fiber is used in conjunction with OTDR 50, the OTDR operator can measure the end-to-end loss of each tested fiber (110a . . . ) using available manual or automatic OTDR loss (measuring) methods.

In another exemplary embodiment of the invention, to facilitate fiber identification, the length of fibers in a TR set can increase (or decrease) in increments, from the lowest to highest numbered (or lettered) port (or pigtail).

In another exemplary embodiment of the invention, in the common holder 12, the N receive fibers 14(a)-14(d) are grouped in a multi-fiber wrapping technique. This technique is used to save space and improve reliability. When using this technique, all N receive fibers 14(a)-14(d) can be wrapped in a single bundle, or may alternatively be divided into two or more bundles with less than all of the N receive fibers 14(a)-14(d) each.

Figure 4:
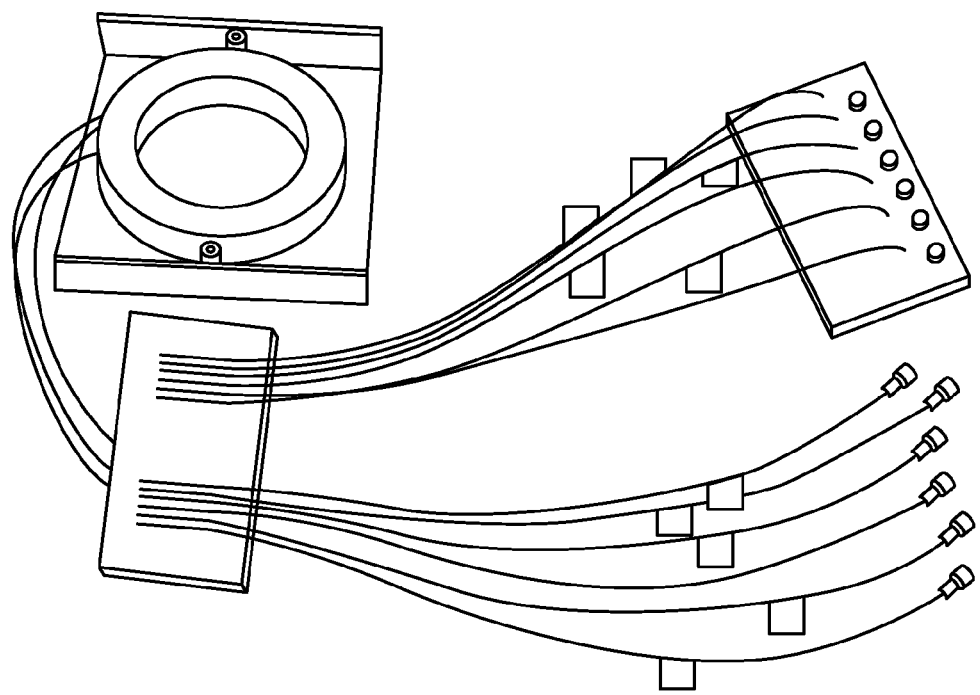
FIG. 4 shows a Test Receiver with an open case showing an exemplary fiber arrangement.
Figure 5:
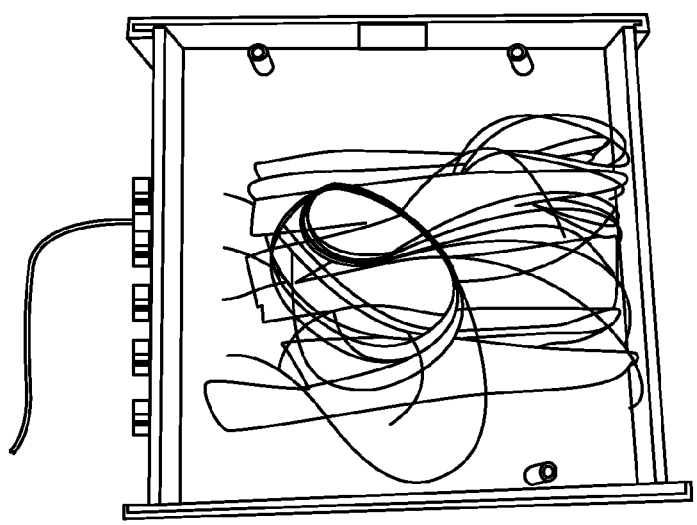
FIG. 5 shows a Test Receiver with an open case showing another exemplary fiber arrangement.

In another exemplary embodiment of the invention, to reduce volume and increase reliability, the fibers in a TR may be wound as shown in FIG. 4. This arrangement reduces space and cost, and improves reliability for TRs 10 with multiple fibers in common holder 12. In each bundle, a short length of a first end of each fiber is kept outside of the bundle so it can be terminated, and a short length of the second end of each fiber is kept outside of the bundle so that it can be cleaved or otherwise terminated to create the desired end-of-fiber marker event.

In another exemplary embodiment of the invention, to reduce the risk of theft or vandalism, TR 10 may be built into a piece of network equipment, such as FTTH fiber distribution hubs, or space for portable TR 10 may be provided inside such network equipment, so that TR 10 may be connected to and used with such equipment while its door(s) or other type security enclosure is safely secured.

In another exemplary embodiment of the invention, when multiple TRs 10 are utilized, two otherwise identical TRs 10 may be differentiated by cleaving the end of each fiber utilized in the first TR 10 at near 0 degrees, to create a high-reflectance (large spike) OTDR event, while each fiber in the second TR 10 can be cleaved at non-zero angles, crushed, or terminated in index matching material, to create a low-reflectance (little or no spike) OTDR event.

Different types of TRs 10 may also be distinguished by adding one or more marker events at intermediate locations of the receive fibers therein. For example, to distinguish two otherwise identical types of TRs 10, a splice with a known loss can be added to all the fibers in one type but not the other.

Marker events can also be combined to create more than two TR types, for example: a first TR Type may have a high reflectivity event at one end; a second TR Type may have a low reflectivity event at one end; a third TR Type may have a high reflectivity event at one end, plus an intermediate event; and a fourth TR Type may have a low reflectivity event at one end, plus an intermediate event. Any event must be of sufficient magnitude and differentiated enough to be identifiable by an OTDR.

In another exemplary embodiment of the invention, OTDR 50 may also enable automatic identification of fibers (e.g., 110a, 110b, 110c) and then display the automatically determined fiber identifier and any other automatically measured fiber parameters thereon.

In this regard, a set of identification schemes for fibers would be pre-defined, and the OTDR software (or post-analysis software on a computer) could: (1) attempt to automatically determine which scheme was in use by looking for flags (fixed event patterns inserted in the identification fiber in addition to ID codes); or (2) the user could select a given scheme from a menu.

Figure 6A:
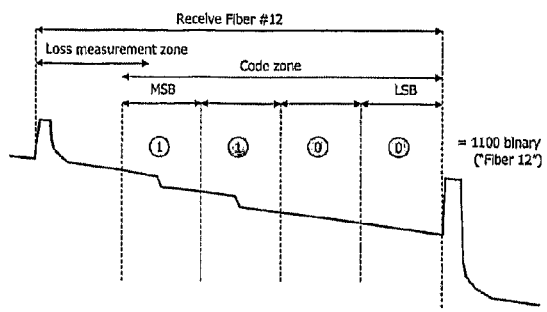
FIG. 6(a) is an exemplary OTDR trace of a receive fiber with a four bit binary fiber identification code constructed using non-reflective events.
Figure 6B:
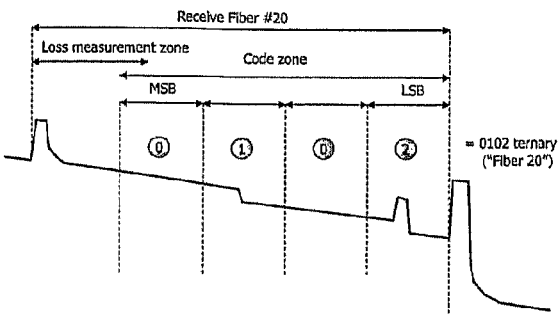
FIG. 6(b) is an exemplary OTDR trace of a receive fiber with a four digit ternary fiber identification code constructed using reflective and non-reflective events.

Marker events can also be added in known patterns to create fiber identification (ID) codes. For example, the presence or absence of a non-reflective event at pre-defined locations (distance slots as opposed to time slots) can encode binary (base 2) numbers (FIG. 6(a)). As another example, use of three or more event "symbols" at pre-defined locations can encode ternary (base 3) or higher base numbers (FIG. 6(b)).

In this regard, symbols in base 3 or higher schemes could be distinguished by loss. For example, in a base 3 scheme, 0 dB=0, 0.25 dB=1 and 0.5 dB=2, or a combination of loss and reflectivity.

Figure 6C:
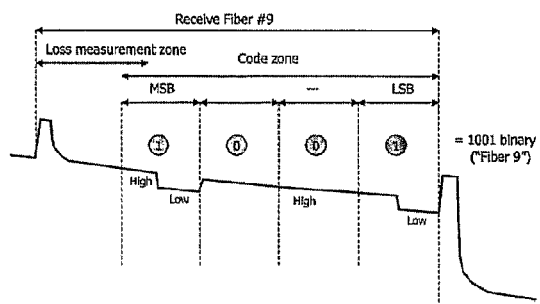
FIG. 6(c) is an exemplary OTDR trace of a receive fiber with a four digit binary fiber identification code constructed using transitions between high- and low-backsccatter coefficient fiber.

Another way to create ID codes is to splice fiber sections with different backscatter coefficients (BC) such that OTDR trace transitions, or non-reflective events, occur at expected locations. FIG. 6(c) shows an example encoding of binary 1001 or decimal 9 using four fiber sections (high BC, low BC, high BC, low BC) of the proper length.

Of course, the invention is not limited to the identification schemes mentioned above, and other identification schemes presently known, or developed in the future, could be used. Further, these identification schemes could also be used for fault location and identification on existing networks.

As compared to the related art testing using a single receive fiber, use of a TR 10 with "N" receive fibers reduces by a factor of "N" the number of times an OTDR operator must travel back and forth between cable ends when testing "N" fibers in one or more fiber optic cables that terminate at a common location. For example, if the TR includes 12 fibers of differing lengths, reflectivity, or some other type of "marker event", then the testing operator will only need one trip to properly test and identify these 12 fibers.

In addition, since each of these fibers is uniquely identified by either the different length or marker event, ensuring that the proper fiber is being tested is much easier, and mistakes can be avoided. In addition, the use of the TR 10 can allow the software to interpret the OTDR trace and automatically relate it back to the appropriate fiber, greatly improving the documentation process for the results.

While the invention has been particularly shown and described with reference to exemplary embodiments thereof, the invention is not limited to these embodiments. It will be understood by those of ordinary skill in the art that various changes in form and details may be made therein without departing from the spirit and scope of the invention as defined by the following claims.

The invention claimed is:

1. A test receiver for use with an Optical Time Domain Reflectometer (OTDR), comprising:
    a housing;
    a first receive fiber having a first length disposed within the housing; and
    a second receive fiber disposed within the housing and having a second length different from the first length,
    wherein a first end of the first receive fiber and a first end of the second receive fiber each terminate at an outer side of the housing,
    wherein the first end of the first receive fiber and the first end of the second receive fiber are optically connected to test optical fibers and are optically connected to an optical light source, and
    wherein a second end of the first receive fiber and a second end of the second receive fiber are the reflecting ends of a test receiver.

2. A test receiver according to claim 1, further comprising:
    a first connector, arranged at the first end of the first receive fiber; and
    a second connector, arranged at the first end of the second receive fiber,
    wherein the first and second connectors are connected to a first end of each of the test optical fibers and the optical light source is connected to a second end of each of the test optical fibers.

3. A test receiver according to claim 1, wherein the first receive fiber includes a first marker event, and the second fiber includes a second marker event.

4. A test receiver according to claim 3, wherein the first marker event and the second marker event differ in reflectivity.

5. A test receiver according to claim 3, wherein the first marker event and the second marker event differ in optical loss.

6. A test receiver according to claim 3, wherein the first marker event and the second marker event differ in backscatter patterns.

7. A test receiver according to claim 1, wherein the housing comprises individual identification for both the first receive fiber and second receive fiber.

8. A test receiver according to claim 1, wherein the first receive fiber and second receive fiber are grouped in a multi-fiber wrap in a common holder.

9. A test receiver according to claim 1, wherein the first and second fibers are wound in a common holder.

10. A test receiver according to claim 9, wherein the first end of at least one of the first and second fibers extends from the portion that is wound, and is cleaved to form an end-of-fiber marker event.

11. A test receiver for use with an Optical Time Domain Reflectometer (OTDR), comprising:
    a housing;
    a first receive fiber having a first length disposed within the housing; and
    a second receive fiber disposed within the housing and having a second length different from the first length,
    wherein a first end of the first receive fiber and a first end of the second receive fiber each terminate at an outer side of the housing,
    wherein a second end of the first receive fiber and a second end of the second receive fiber are not connected to an optical light source, and
    wherein the first receive fiber includes a first marker event, and the second fiber includes a second marker event.

12. A test receiver according to claim 11, wherein the first marker event and the second marker event differ in reflectivity.

13. A test receiver according to claim 11, wherein the first marker event and the second marker event differ in optical loss.

14. A test receiver according to claim 11, wherein the first marker event and the second marker event differ in backscatter patterns.

15. A test receiver for use with an Optical Time Domain Reflectometer (OTDR), comprising:
    a housing;
    a first receive fiber having a first length disposed within the housing; and
    a second receive fiber disposed within the housing and having a second length different from the first length,
    wherein a first end of the first receive fiber and a first end of the second receive fiber each terminate at an outer side of the housing,
    wherein a second end of the first receive fiber and a second end of the second receive fiber are not connected to an optical light source, and
    wherein the first and second fibers are wound in a common holder and the first end of at least one of the first and the second fibers extends from the portion that is wound, and is cleaved to form an end-of-fiber marker event.

* * * * *